United States Patent [19]

Macip-Boulis et al.

[11] Patent Number: 5,525,643
[45] Date of Patent: Jun. 11, 1996

[54] THERMALLY INSULATIVE, MICROPOROUS XEROGELS AND AEROGELS

[75] Inventors: M. Antonieta Macip-Boulis; Aheed G. Boulis, both of Lancaster, Pa.

[73] Assignee: Armstrong World Industries, Inc., Lancaster, Pa.

[21] Appl. No.: 493,153

[22] Filed: Jul. 28, 1995

[51] Int. Cl.$^6$ .................................. C08J 9/00
[52] U.S. Cl. .............................. 521/154; 528/12
[58] Field of Search ................. 521/154; 528/12

[56] References Cited

U.S. PATENT DOCUMENTS

| | | | |
|---|---|---|---|
| 4,418,151 | 11/1983 | Modic | 528/31 |
| 4,421,904 | 12/1983 | Eckberg et al. | 528/31 |
| 4,528,324 | 7/1985 | Chung et al. | 528/12 |
| 5,306,555 | 4/1994 | Ramamurthi et al. | 428/289 |

OTHER PUBLICATIONS

"Rubbery Ormosils and Their Applications", John D. Mackenzie, Y. J. Chung, Y. Hu; Journal of Non-Crystalline Solids, 147&148, 1992, pp. 271–279.

"Rubbery Ormosils", Young J. Chung, Su-Jen Ting, John D. Mackenzie; Materials Research Society Symp. Proc., vol. 180, 1990, pp. 981–986.

"Rubber-like Elasticity of Organically Modified Silicates", Y. Hu, J. D. Mackenzie, Journal of Materials Science, 27, 1992, pp.4415–4420.

*Primary Examiner*—Morton Foelak

[57] ABSTRACT

Microporous aerogel and xerogel compositions are prepared by a random polymerization reaction of a silanol-terminated polydimethylsiloxane (PDMS) and tetraethoxysilane (TEOS) and/or methyltriethoxysilane (MTEOS) at a molar ratio of at least about 0.012 of the PDMS to TEOS and/or MTEOS to form a gel. The reaction is in the presence of an acid catalyst at a molar ratio of at least about 0.5 acid to TEOS and/or MTEOS, water at a molar ratio in the range of from about 6 to about 15 of the water to TEOS and/or MTEOS and a solvent at a minimum molar ratio of about 4 of the solvent to TEOS and/or MTEOS. In the preparation process, the gel is aged. When elevated temperatures of at least about 40° C. up to the boiling point of the solvent are used in aging, the gel can be aged for a period of at least about 24 hours. At temperatures from ambient up to about 40° C., the gel is aged for a minimum of about 48 hours.

5 Claims, No Drawings

THERMALLY INSULATIVE, MICROPOROUS XEROGELS AND AEROGELS

BACKGROUND OF THE INVENTION

FIELD OF THE INVENTION

Microporous silica aerogel and xerogel structures are described which are suitable as thermal insulation. These xerogels and aerogels are produced by the process described herein which carefully controls the ratios of ingredients, catalyst, and solvent.

Thermal insulation is an important and valuable product. Although many insulative compositions are already in use, there is a continuing desire for energy conservation pushing a drive to achieve insulation having lower thermal conductivity. Microporous silica aerogel structures have excellent characteristics for insulation.

One reference which describes such silica structures is "Rubbery Ormosils and Their Applications" by John D. Mackenzie *Journal of Non-Crystalline Solids*, 147&148 (1992) 271–279. In that reference, organically modified silicates (ormosils) are produced using silanol terminated polydimethylsiloxane (PDMS) and tetraethoxysilane (TEOS) in a mixture of ethanol, HCl and water using a molar ratio of 1TEOS/0.08PDMS/3H2O/0.3HCl. The materials produced by the methods of this reference, however, do not give highly microporous structures. To the contrary, the pores are large, and as a result, the thermal conductivity is disadvantageously high.

It would be advantageous to obtain silica aerogels and xerogels having a microporous structure and a better thermal conductivity. Accordingly, it is an object of the present invention to achieve microporous aerogel and xerogel structures which are good thermal insulation. It is a further object of the present invention to achieve processes which result in more highly microporous aerogel and xerogel structures.

SUMMARY OF THE INVENTION

Microporous structures which are copolymerized organic/inorganic xerogel and aerogel compositions can be produced by controlling the chemical composition of the ingredients of the preparation process, certain molar ratios and process conditions.

These microporous aerogel and xerogel compositions are obtained by the copolymerization of silanol-terminated polydimethylsiloxane (PDMS) with tetraethoxysilane (TEOS) and/or methyltriethoxysilane (MTEOS). The compositions (both xerogels and aerogels) have a porosity of about 75% or greater and a thermal conductivity at a maximum of about 0.04 watt/meter°Kelvin (W/m°K).

In preparing these xerogels and aerogels, the following ingredients are mixed in the presence of an acid catalyst: 1) water, 2) a member selected from the group consisting of tetraethoxysilane (TEOS), methyltriethoxysilane (MTEOS) and mixtures thereof, 3) silanol-terminated polydimethylsiloxane (PDMS), and 4) at least one a solvent. When these ingredients are mixed, a random polymerization reaction occurs, forming a gel.

In combining the ingredients, the following molar ratios are maintained: the water/(TEOS and/or MTEOS) molar ratio is acceptably in the range of from about 6 to about 15; the PDMS/(TEOS and/or MTEOS) ratio acceptably is a minimum of at least about 0.012; the molar ratio of an acidic catalyst/(TEOS and/or MTEOS) acceptably is a minimum of at least about 0.5 or more; the solvent/total amount of TEOS and/or MTEOS molar ratio is a minimum of about 4.

The ingredients can be combined under any conditions which maintain the ingredients in a liquid state. Refluxing, for example can be used. In a preferred embodiment, the ingredients can be combined at temperatures from about 20° to about 95° C. When the mixture begins to gel, the reacting gel mixture is allowed to sit while the polymerization (or condensation) reaction continues. This can be called "aging", and it can be done at temperatures of from about ambient (room temperature) up to the boiling point of the solvent.

The time allowed for aging (the aging period) can be shortened by using a higher temperature. If, for example, ambient temperatures are used, the gel should be aged for at least about 48 hours. Preferably, the reacting gel is aged for a minimum of at least about 24 hours at temperatures of at least about 40° C. (up to the boiling point of the solvent). At temperatures from about ambient (23° C.) up to about 40° C., the gel is aged for a minimum of about 48 hours.

In a preferred embodiment, the ingredients are combined and stirred at a temperature in the range of from about 40° C. up to the boiling point of the solvent. Stirring is continued until the gel begins to form, and then the reacting gel mixture is aged.

During the aging period, the polymerization reaction has continued so that a higher crosslinking density is obtained. The aged, wet gel is then dried to form the product. Drying can be done at either atmospheric pressure (to produce a xerogel) or under supercritical conditions (to produce an aerogel). With either drying step, the product achieved will be microporous and will have a low thermal conductivity (in the range of from 0.03 to about 0.04 W/m°K) or super low thermal conductivity (less than 0.03 W/m°K).

DETAILED DESCRIPTION

Advantageously, the process described herein can be used to obtain aerogel or xerogel thermal insulation. The aerogel and xerogel materials produced have both a high porosity and small pores (it will be microporous). In fact, the aerogel and remarkably, even the xerogel products are so microporous that they have at least about 25% of the pore volume in pores that are less than about 50 nanometers (nm.) in diameter.

The xerogel is the polymerized gel product which has been dried at atmospheric pressure. The aerogel is the polymerized gel product which has been dried with a gas such as carbon dioxide under supercritical conditions. Thus, in drying, carbon dioxide is used at a temperature at which no amount of pressure will be able to liquify the gas. Preferably, with the carbon dioxide, the temperature will be about 32° C. or more, and the pressure used will be a minimum of about 900 PSI (pounds per square inch).

To obtain these products, a random polymerization reaction is conducted by mixing water, a member selected from the group consisting of tetraethoxysilane (TEOS), methyltriethoxysilane (MTEOS) and mixtures thereof, silanol-terminated polydimethylsiloxane (PDMS), and a solvent in the presence of an acid catalyst. The water is added for hydrolysis and to help with the microstructure of the system.

Acceptably, when the reaction ingredients are mixed, their amounts will be controlled so that the indicated molar ratios are maintained. The following molar ratio ranges may be used: the water/(TEOS and/or MTEOS) molar ratio is in the range of from about 6 to about 15; the PDMS/(TEOS and/or MTEOS) is in the range of from about 0.012 to about 0.1; the molar ratio of an acidic catalyst/(TEOS and/or MTEOS) is in the range of from about 0.5/1 to about 3/1; the solvent/total amount of TEOS and/or MTEOS molar ratio is in the range of from about 4 to about 15.

For thermal insulation of either xerogel or aerogel (a more preferred product), the PDMS/(TEOS and/or MTEOS) is in the range of from about 0.055 to about 0.027; the water/(TEOS and/or MTEOS) molar ratio is preferably in the range of from about 6.5 to about 10; the molar ratio of an acidic catalyst/(TEOS and/or MTEOS) is preferably in the range of from about 0.5/1 to about 2/1; the solvent/total amount of TEOS and/or MTEOS molar ratio is preferably in the range of from about 5 to about 10. From this reaction, a preferred thermal insulation product can be expected having a porosity of at least about 80% (with both xerogels and aerogels) and a thermal conductivity of a maximum of about 0.035 W/m°K for xerogels and about 0.025 W/m°K for aerogels.

Any amounts of the ingredients can be used, as long as the indicated molar ratios of the ingredients are maintained.

To conduct these random polymerization reactions, an acid catalyst is used. Any acid that is capable of acting as a catalyst here can be used. A preferred acid catalyst can be selected from the group consisting of hydrochloric acid, nitric acid, sulfuric acid and mixtures thereof. Most preferably, the catalyst is hydrochloric acid.

The solvent can be selected from one or more of any hydrocarbon solvent. Acceptably, the solvent can be selected from the group consisting of ethanol, propanol, isopropanol, tetrahydrofuran, benzene, toluene, dimethylformamide, and mixtures thereof. Preferably the solvent is selected from ethanol, propanol, isopropanol, tetrahydrofuran, dimethylformamide, and mixtures thereof.

Even under ambient (room) temperatures when the ingredients are mixed in the presence of an acid catalyst, a wet gel will be formed by the random polymerization. The ingredients can be mixed under any conditions that maintain the ingredients as liquid. In a preferred embodiment, the temperature is in the range of from about 20° C. up to about 95° C.

For the most highly porous and most microporous product, it is important to allow this reaction to continue by aging the gel before drying it to form the product. If the wet gel obtained is dried without aging, the pores will be unnecessarily large. During aging the polymerization reaction continues so that a higher crosslinking density is obtained. When the gel has a higher crosslinking density, then it will give a more microporous product. Porosity will also be increased.

Mixing and aging can preferably be done at temperatures from about ambient up to the boiling point of the solvent being used. When, for example, isopropanol is the solvent, the temperature can acceptably be anywhere in the range of from about ambient up to about 80° C.

More preferably, however, mixing is done at ambient temperatures (about 23° C.) up to the solvent boiling point while aging is done at a minimum of about 40° C. (up to the boiling point of the solvent). Most preferably, the ingredients, solvent, and catalyst are mixed at room temperature and then the reacting mixture is heated while mixing is continued at a temperature up to the solvent boiling point until a gel begins to form. Thereafter, the gel is aged at the elevated temperature (from 40° C. up to the solvent boiling point). For aging, since it is desirable to increase the crosslinking density of the gel, a more preferred temperature is in the range of from about 40° to about 60° C., although the temperature can acceptably be maintained at a temperature up to the boiling point of the solvent.

After the wet gel is aged, it is then dried. Drying can be done at either ambient pressures (to make a xerogel) or at supercritical pressures to make an aerogel.

Both the xerogel and aerogel preferred product will have a porosity of at least about 80%. Xerogel insulation most preferably has a porosity of at least about 86%. Aerogel thermal insulation most preferably has a porosity of at least about 87%. A preferred xerogel product will have a maximum thermal conductivity of about 0.04 W/mK° (watts per meter degrees kelvin). Most preferably, as thermal insulation, the xerogel used will have a maximum conductivity of about 0.030 W/mK°. A preferred aerogel product will have a maximum thermal conductivity of about 0.025 W/mK°. Most preferably, the aerogel thermal insulation will have a maximum conductivity of about 0.02 W/mK°.

When preferred xerogels are made in accordance with the present invention, it is remarkable that surface areas in excess of 100 meter$^2$/gram (m$^2$/g) are achieved.

As thermal insulation, the aerogels and xerogels can be used as monoliths or even as particles or in powder form. The monoliths, however, will tend to have a lower thermal conductivity. In chunk (particle) form, the aerogel or xerogel is convenient as pour-in-place thermal insulation where it is used simply by pouring it into the place to be insulated. If desired, the product can also be comminuted to a powder.

All of the ingredients, such as the reactants PDMS, TEOS and MTEOS, are readily available. The reactants, for example, can easily be found in the commercial market.

The inventions described herein are illustrated in and can be better understood with the following examples. These examples are thus intended to illustrate the present invention and should not be taken to limit it. All parts and percentages are by weight unless otherwise indicated.

GENERAL PROCEDURE

All of the Examples that follow were prepared according to the following procedure:

The TEOS and/or MTEOS, PDMS, and the co-solvent THF (tetrahydrofuran) were combined and stirred. Half of the isopropanol (solvent) was added to the combined TEOS, PDMS, and THF. The water, acid, and the rest of the solvent isopropanol was combined and then added to the stirring mixture of TEOS, PDMS, and THF. This combination was then refluxed and stirred at 80° C. until the mixture was at the gelation point (where it was getting viscous). The viscous product was then poured into wax coated Petri dishes and gelation was allowed to proceed. The sample produced was then aged for 24 hours at 40° C. to permit the reaction to continue (further crosslinking the gel structure). If an aerogel was being made, the sample was then washed in ethanol before drying. The samples were then dried. The aerogels were dried under supercritical conditions. The xerogels were dried at atmospheric pressure and 60° C.

In the Examples that follow, the TEOS and MTEOS were obtained from Aldrich Chemical Co. and the PDMS were obtained from Huls America.

EXAMPLE 1

The following ingredients and amounts were combined according to the previously described procedure:

| Ingredient | Amount (millimeters) |
|---|---|
| TEOS | 25 |
| PDMS | 10.1 |
| THF | 15.1 |
| isopropanol | 60 |
| HCl (concentrated) | 6.37 |
| water | 12.8 |

The thermal conductivity of the sample obtained was measured using a Thin Foil Heater apparatus. The thermal conductivity of the sample was found to be 0.031W/m°K.

EXAMPLES 2-7

In Examples 2–7 which follow, xerogel monoliths were prepared using the previously described process. The following molar ratios were used:

PDMS/TEOS= 0.021

HCL/TEOS= 0.7

Solvent/TEOS= 8.8

The solvent was a mixture of 0.19 mols of tetrahydrofuran (THF) and 0.78 mols of isopropanol. The PDMS had a molecular weight of 4200 (weight average).

The water/TEOS molar ratio was varied for each example. The monoliths produced were measured for: thermal conductivity, skeletal density, bulk density, surface area and porosity. The results are given below for each example.

EXAMPLE 2

The molar ratio of water/TEOS for this example was 3. The following data was collected:

| Bulk Density | 0.205 grams/centimeter$^3$ (g/cm$^3$) |
|---|---|
| Skeletal Density | 1.318 g/cm$^3$ |
| Surface Area | 1 meter$^2$/g (m$^2$/g) |
| Porosity | 85% |
| Thermal Conductivity | 0.044 W/m °K. |

EXAMPLE 3

The molar ratio of water/TEOS for this example was 6. The following data was collected:

| Bulk Density | 0.192 g/cm$^3$ |
|---|---|
| Skeletal Density | 1.255 g/cm$^3$ |
| Surface Area | 14 m$^2$/g |
| Porosity | 85% |
| Thermal Conductivity | 0.038 W/m °K. |

EXAMPLE 4

The molar ratio of water/TEOS for this example was 6.5. The following data was collected:

| Bulk Density | 0.191 g/cm$^3$ |
|---|---|
| Skeletal Density | 1.321 g/cm$^3$ |
| Surface Area | 322 m$^2$/g |
| Porosity | 86% |
| Thermal Conductivity | 0.030 W/m °K. |

EXAMPLE 5

The molar ratio of water/TEOS for this example was 7. The following data was collected:

| Bulk Density | 0.177 g/cm$^3$ |
|---|---|
| Skeletal Density | 1.279 g/cm$^3$ |
| Surface Area | 350 m$^2$/g |
| Porosity | 86% |
| Thermal Conductivity | 0.031 W/m °K. |

EXAMPLE 6

The molar ratio of water/TEOS for this example was 10. The following data was collected:

| Bulk Density | 0.192 g/cm$^3$ |
|---|---|
| Skeletal Density | 1.315 g/cm$^3$ |
| Surface Area | 414 m$^2$/g |
| Porosity | 85% |

The thermal conductivity could not be measured for the sample because the monolith cracked during drying.

EXAMPLE 7

The molar ratio of water/TEOS for this example was 15. The following data was collected:

| Bulk Density | 0.632 g/cm$^3$ |
|---|---|
| Skeletal Density | 1.315 g/cm$^3$ |
| Surface Area | 393 m$^2$/g |
| Porosity | 52% |

The thermal conductivity could not be measured for the sample because the monolith cracked during drying.

EXAMPLE 8

For this example, a xerogel monolith was produced by reacting a mixture of MTEOS and TEOS with 0.052 mols of PDMS (which had a weight average molecular weight of 1700). There were 0.1 mols of MTEOS and 0.9 mols of TEOS; taken together there was a total of 1 mol of TEOS and MTEOS. The final molar ratios of solvent, HCl and water to the MTEOS and TEOS taken together was 8.8, 0.7, and 7 respectively.

The following data was collected:

| Bulk Density | 0.163 g/cm$^3$ |
|---|---|
| Skeletal Density | 1.298 g/cm$^3$ |
| Surface Area | 296 m$^2$/g |
| Porosity | 87% |
| Thermal Conductivity | 0.032 W/m °K. |

EXAMPLES 9–10

Two samples of wet gels were prepared and using the previously described process and the formulation used previously for Example 5. These wet gels, however, were dried under supercritical conditions using carbon dioxide to produce an aerogel; the temperature was 42° C. and the pressure was 1290 PSI. The weight average molecular weight of the PDMS for Example 9 was 4200 and for Example 10, it was 1700.

|  | Example 9 | Example 10 |
| --- | --- | --- |
| Bulk Density | 0.187 g/cm$^3$ | 0.172 g/cm$^3$ |
| Skeletal Density | 1.414 g/cm$^3$ | 1.350 g/cm$^3$ |
| Surface Area | 764 m$^2$/g | 554 m$^2$/g |
| Porosity | 87% | 87% |
| Thermal Conductivity | 0.021 W/m°K | 0.023 W/m °K |

We claim:

1. A process for thermally insulative xerogel and aerogel compositions comprising reacting a silanol-terminated polydimethylsiloxane and tetraethoxysilane or methyltriethoxysilane, or both tetraethoxysilane and methyltriethoxysilane in the presence of an acid catalyst, water, and a solvent, wherein the polydimethylsiloxane to tetraethoxysilane and/or methyltriethoxysilane was at a molar ratio of a minimum of about 0.012, the acid to tetraethoxysilane and/or methyltriethoxysilane was at a molar ratio of a minimum of about 0.5, the water to tetraethoxysilane and/or methyltriethoxysilane was at a molar ratio in the range of from about 6.5 to about 15, and the solvent to tetraethoxysilane and/or methyltriethoxysilane was at a molar ratio of a minimum of about 4 wherein the polydimethylsiloxane and tetraethoxysilane and/or methyltriethoxysilane are reacted to form a gel, allowing the gel to age either for at least about 24 hours at temperatures in the range of from about 40° C. up to the boiling point of the solvent, or for at least about 48 hours at temperatures of from about 23° C. up to about 40° C., and drying the gel either at atmospheric pressure to obtain the xerogel, or at supercritical conditions to obtain the aerogel.

2. A process as described in claim 1 wherein the silanol-terminated polydimethylsiloxane and tetraethoxysilane and/or methyltriethoxysilane were reacted at a temperature in the range of from about 23° C. up to the boiling point of the solvent.

3. A process as described in claim 1 wherein the molar ratio of the acid to tetraethoxysilane and/or methyltriethoxysilane was in the range of from about 0.5 to about 3.

4. A process as described in claim 1 wherein the molar ratio of the solvent to tetraethoxysilane and/or methyltriethoxysilane was in the range of from about 4 to about 15.

5. A process as described in claim 1 wherein the molar ratio of the tetraethoxysilane and/or methyltriethoxysilane to polydimethylsiloxane was in the range of from about 0.012 to about 0.1.

* * * * *